United States Patent [19]
Griggs et al.

[11] Patent Number: 6,106,792
[45] Date of Patent: Aug. 22, 2000

[54] APPARATUS AND METHOD FOR CLEANING GAS

[75] Inventors: William A. Griggs, Southhaven; Jerry S. Pool, Hernando, both of Miss.; Joe D. York, Arlington, Tex.

[73] Assignee: L&P Property Management Company, South Gate, Calif.

[21] Appl. No.: 09/050,681

[22] Filed: Mar. 30, 1998

[51] Int. Cl.⁷ .............................. B01J 8/00; B01D 47/06
[52] U.S. Cl. .................... 423/245.2; 423/236; 95/147; 95/239; 96/243; 261/117
[58] Field of Search ........................... 95/147, 221, 239, 95/272, 151, 216, 237; 96/243, 335, 336; 261/117; 423/236, 245.1, 245.2

[56] References Cited

U.S. PATENT DOCUMENTS

| | | |
|---|---|---|
| 1,783,813 | 12/1930 | Schneible . |
| 2,585,440 | 2/1952 | Collins . |
| 3,546,851 | 12/1970 | Hardison et al. . |
| 3,651,620 | 3/1972 | Lincoln ..................................... 55/228 |
| 3,751,882 | 8/1973 | Phillips ..................................... 55/236 |
| 3,926,592 | 12/1975 | Leva . |
| 3,930,816 | 1/1976 | Miczek . |
| 3,933,450 | 1/1976 | Percevaut . |
| 3,989,465 | 11/1976 | Onnen . |
| 4,012,469 | 3/1977 | Accortt ..................................... 261/117 |
| 4,110,088 | 8/1978 | Cold et al. . |
| 4,132,537 | 1/1979 | Bennett . |
| 4,374,813 | 2/1983 | Chen et al. . |
| 4,469,493 | 9/1984 | Tuovinen et al. . |
| 4,529,423 | 7/1985 | Johnson . |
| 4,810,268 | 3/1989 | Chambers et al. . |
| 4,990,167 | 2/1991 | Stehning . |
| 5,123,936 | 6/1992 | Stone et al. .................................. 55/8 |
| 5,181,944 | 1/1993 | Jarvenpaa . |
| 5,201,919 | 4/1993 | Jahn et al. . |
| 5,391,220 | 2/1995 | Patterson . |
| 5,656,047 | 8/1997 | Odom et al. . |

FOREIGN PATENT DOCUMENTS 0 622 400 A1  4/1994  European Pat. Off. .

*Primary Examiner*—Steven P. Griffin
*Assistant Examiner*—Elin A Warn
*Attorney, Agent, or Firm*—Wood, Herron & Evans, L.L.P.

[57] ABSTRACT

A method and apparatus for removing TDI from a gas in which the gas containing the TDI is forced through a scrubber tank. A first water spray is in fluid communication with the gas flowing through an inlet pipe and initially reacts the TDI in the gas with water. The gas is directed against a water surface at the bottom of the tank and thereafter, flows up an interior side wall of the tank. Deflectors mounted on the side wall disrupt the laminar flow of the gas and redirect it in a turbulent manner through a second water spray prior to the gas exiting the scrubber tank.

8 Claims, 3 Drawing Sheets

APPARATUS AND METHOD FOR CLEANING GAS

BACKGROUND OF THE INVENTION

This invention relates generally to removing pollutants from a gas and more particularly, to removing water reactive pollutants from the gas.

The use for various scrubbing apparatus and methods for the removal of particulate matter and gaseous contaminates, such as, water reactive pollutants, from airstreams in order to minimize pollution is well known. For example, in the manufacture of polyurethane foam, the feed stock often contains toluene 2, 4-Diisocyanate ("TDI") which is considered a pollutant and the concentrations of which in ambient air are regulated. Therefore, gases created during portions of the polyurethane foam manufacturing process which contain TDI must be cleansed prior to being released to atmosphere. Known systems use a gas scrubber apparatus to react the TDI in the gas with water and collect the resulting urea. Thereafter, the gases pass through a cyclone to further remove the pollutants prior to being vented to atmosphere. There is a continuing effort to improve the capabilities and efficiencies of such gas cleaning systems to meet ever more stringent TDI concentration levels.

Consequently, there is a need for a gas scrubber system that provides improved efficiency and performance over known scrubber systems with respect to the removal of TDI from a gas.

SUMMARY OF THE INVENTION

The present invention provides several improvements to known gas scrubber systems for removing TDI from the gas. With the improvement, more of the TDI is reacted and removed by the scrubber system, thereby placing less burden on downstream equipment. The invention is especially useful in those applications where TDI may be drawn off during manufacturing and curing of large polyurethane foam pieces.

According to the principles of the present invention and in accordance with the preferred embodiment, a gas scrubber for removing TDI from a gas includes a tank having water at the bottom thereof. A blower is in fluid communication with the tank and is effective to provide the forces or pressure differentials necessary to move the gas through the tank. An inlet pipe extends into the tank and has an inlet for receiving the gas and an outlet for directing the gas at a first velocity toward the water in the bottom of the tank. A first water spray is in fluid communication with the gas flowing through the inlet pipe, and the first water spray reacts with the TDI in the gas to form urea. Deflectors are mounted above the water and circumferentially around the interior wall of the tank. The blower moves the gas across the surface of the water at a second slower velocity and past the deflectors to disrupt laminar flow of the gas near the interior wall of the tank. The gas then passes through a second water spray to further react the TDI in the gas with the water prior to the gas exiting the tank through the tank outlet.

In one aspect of the invention, the inlet pipe has an L-shaped section with a generally horizontal section in fluid communication with the inlet and a generally vertical section in fluid communication with the inlet pipe outlet. The first water spray is located in the generally vertical section of the inlet pipe.

In another embodiment of the invention, a method of removing TDI from a gas comprises the steps of passing the gas downward through an upward flowing first water spray in a tank at a first velocity to react the TDI in the gas with the water. The gas is then directed against water in the bottom of the tank to wash reactants of the TDI and water from the gas. Next, gas is directed upward along an interior wall of the tank at a slower velocity. The gas is deflected from the interior wall and is directed in an upward turbulent flow through the tank at the slower velocity through a second water spray to further react the TDI in the gas with the water.

The present invention provides an improved gas scrubbing apparatus and method which utilizes an inlet water spray to initially react the TDI with the gas. In addition, deflectors along the interior side wall of the tank are effective to disrupt laminar flow of the gas along the interior wall and create more turbulent flow to further react the TDI with water emanating from a second spray at the top of the tank. The net result is that substantially all of the TDI is reacted with the water in the scrubber system, and approximately half of the particulate pollutants are separated from the gas in the scrubber system. By substantially improving the efficiency and performance of the gas scrubber system, the invention has the advantage of reducing the requirements of downstream equipment.

These and other objects and advantages of the present invention will become more readily apparent during the following detailed description taken in conjunction with the drawings herein.

DETAILED DESCRIPTION OF THE INVENTION

Figure 1:
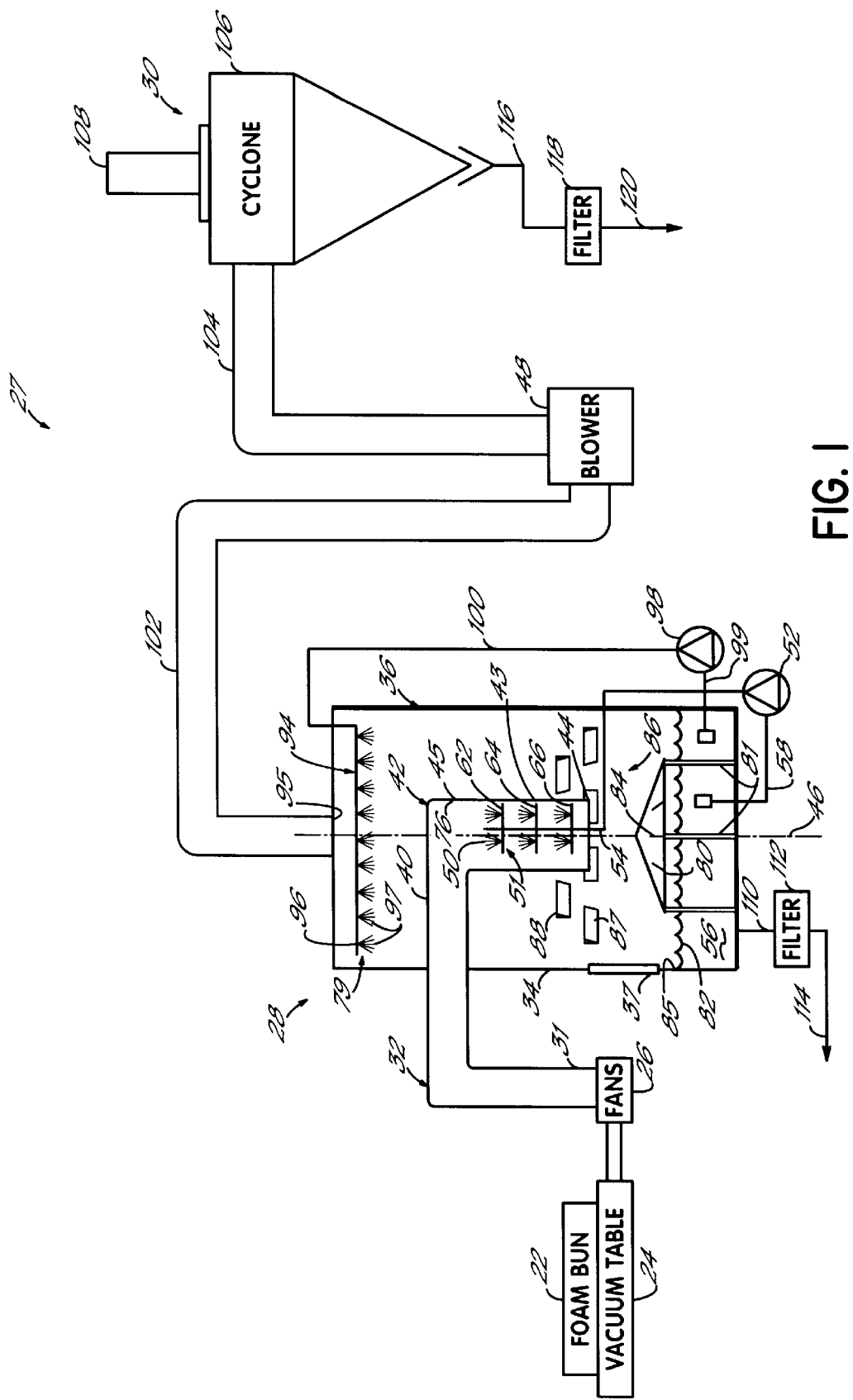
FIG. 1 is a schematic diagram illustrating the fundamental components used in the gas cleaning system in accordance with the principles of the present invention.

In one process for manufacturing polyurethane foam, a polymer, additives and other chemicals are mixed in their liquid phase and deposited onto a continuously moving plastic web. The deposited liquid includes TDI which reacts exothermically with air and begins a process of expanding into foam while at the same time substantially increasing in temperature. In some processes, a foam part or "bun" is produced that may be up to approximately 4 feet high, 7 feet wide and 60 feet long. During the curing process, the internal temperatures are normally in the range of 280° F.–380° F. After partial curing, the plastic web is removed from the bun; and, referring to FIG. 1, the foam bun 22 is placed on a vacuum table 24. A fan 26 is effective to pull cooling air through the bun 22 in order to cool the bun as well as pull out the TDI. The fan 26 is connected to a gas cleaning system 27 which is comprised of a first stage scrubber system 28 and a second stage cyclone 30.

As previously discussed, the TDI is highly reactive with water and therefore, is continuously, turbulently and vigorously mixed with water during the entire scrubbing process within the scrubber system 28. The fan 26 directs the gas into an input end 31 of a scrubber inlet conduit or pipe 32 which directs the cooling gas into a normally cylindrical scrubber tank 36. The tank 36 has a door 37 providing access to the tank interior. The scrubber tank 36 is sized to meet the system capacity and design requirements and, may be for example, approximately 12 feet in diameter and 20 feet high. The inlet conduit 32 may, for example, be approximately 3.5 feet in diameter. The inlet end 31 of the inlet pipe 32 extends upward and is connected to one end of a horizontal pipe section 40. The horizontal section 40 extends radially through an exterior, cylindrical, tank side wall 34 and is connected to a horizontal section of an elbow 42. The elbow 42 of the inlet 32 has a vertical, exit section 43 with an outlet end 44 located colinearly with a centerline 46 of the tank 36. The fan 26 is, for example, a 25 Hp fan, and operates in combination with a blower 48, for example, a 100 Hp blower, to force the gas through the foam bun 22, the scrubber tank 36 and the cyclone 30. Such a system has a gas flowrate of, for example, 30,000 cubic feet per minute.

To facilitate the reaction of TDI with water, the gas is forced downward through an exit portion 43 of the inlet conduit 32, past a highly concentrated and intense water spray 50 provided by a water spray assembly 51. The water is supplied under pressure by a pump 52 connected to the spray assembly 51 by pipes 54. The water is withdrawn from a reservoir of water 56 by pipes 58. The pipes 54, 58 are also connected to various valves, filters or strainers as is well known. The water spray assembly 51 includes three tiers of nozzles 62, 64, 66, each at a different elevation within the exit section 43 of inlet conduit 32.

Figure 2:
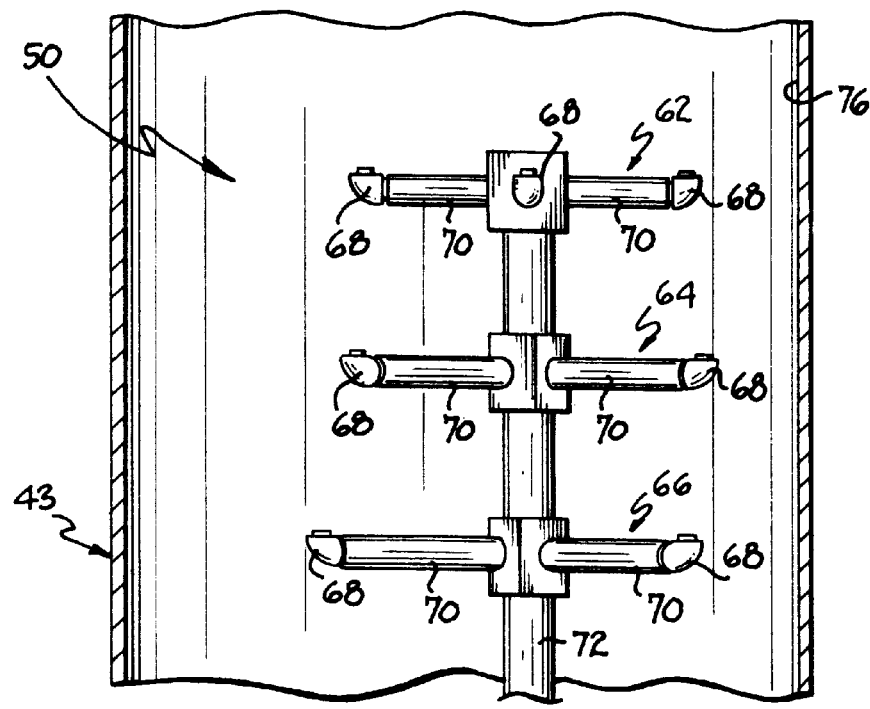
FIG. 2 is a side elevation view of a tiered water spray assembly used in the gas scrubber of FIG. 1.
Figure 3:
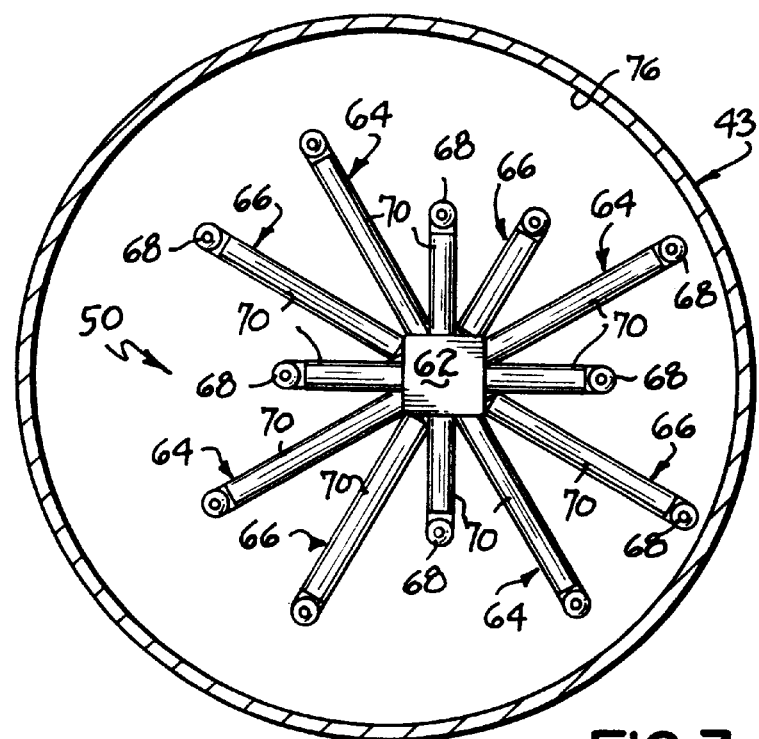
FIG. 3 is a top plan view of the tiered water spray assembly used in the gas scrubber of FIG. 1.

Referring to FIGS. 2 and 3, each of the tiers 62, 64, 66 has four spray nozzles 68 mounted on the distal ends of extension arms 70 that are connected at their respective proximal ends to a central supply line 72. The extension arms 70 of each of the tiers 62, 64, 66 are at right angles to each other. Further, referring to FIG. 3, the extension arms 70 of the nozzle tier 64 are angled at 30° with respect to the extension arms 70 of the nozzle tier 66. In addition, the extension arms 70 of the tier 62 are angled at 30° with respect to the extension arms 70 of the nozzle tier 64. It should be noted that, in the present embodiment, the water spray assembly 51 is not centered within the exit section 43. The gas moving through the horizontal section 40 of the inlet pipe 32 has a high velocity; and as it strikes the interior vertical surface 76 of the elbow 42, the gas compresses and is denser at a location closer to the vertical side wall 76 that extends through the exit section 43 of pipe 32. To increase the reaction of the TDI in the denser concentration of gas with the water sprays 50, the spray assembly 51 is offset from the centerline 46 and is moved closer to the vertical side wall 76 against which the gas is impinging.

Figure 4:
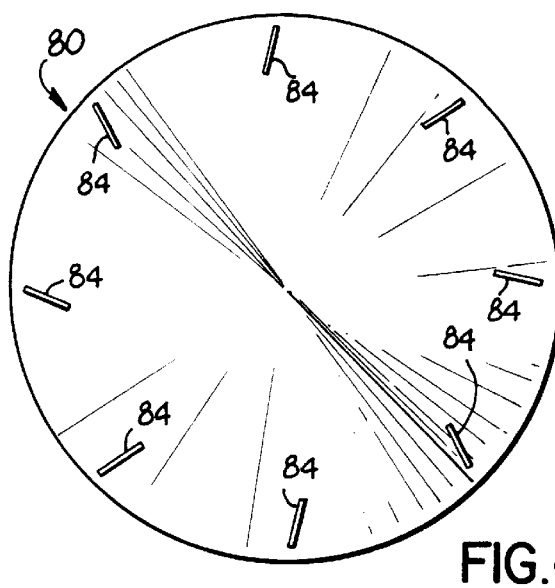
FIG. 4 is a top plan view of a conical diffuser used in the gas scrubber of FIG. 1.
Figure 5:
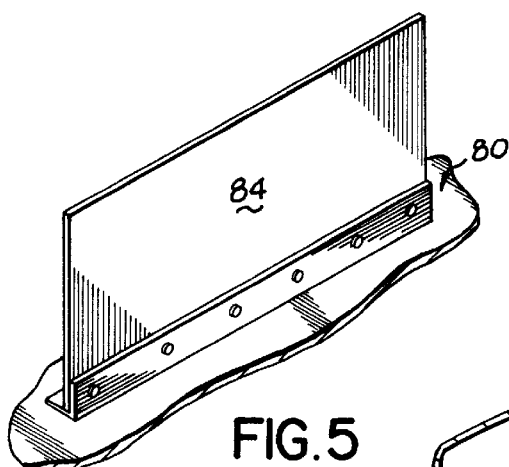
FIG. 5 is a perspective view of a deflector element mounted on an upper surface of the conical diffuser of FIG. 4.

The force of the pressure differential created by the fan 26 and blower 48 causes the gas to flow through the exit section 43 of the inlet pipe 32 at a high velocity. To further facilitate the reaction of the TDI with the water, the spray assembly 51 directs the water spray 50 in an upward direction opposite the high velocity, downward flowing gas, thereby causing the gas flow to be turbulent as it exits the inlet conduit 32. Thus, the gas exits the outlet 44 of the inlet pipe 40 with a turbulent flow in a downward direction and strikes a conically shaped diffuser 80 mounted on supporting brackets 81 immediately above the surface 82 of the water 56. Referring to FIGS. 1, 4 and 5, the conical deflector 80 has a peripheral deflecting elements 84 to inhibit laminar flow across the deflector 80 and direct the gas from the deflector 80 across the surface 82 of the water 56.

Referring to FIG. 1, chemical reaction of the TDI in the gas with the water causes the formation of fine particles, for example, powder-like particles, of urea. As the gas passes over the surface 82 of the water 56, some of those particles are captured at the surface 82 of the water 56 and form a froth or foaming of the water surface 82. Thus, the TDI is removed from the gas. After being directed across the surface 82 of the water 56, the gas flow turns upward and is concentrated and denser immediately adjacent an inside surface 85 of the exterior cylindrical wall 34. Further, the gas tends to move in a laminar flow upward along the inside surface 85 of the exterior wall 34.

Figure 6:
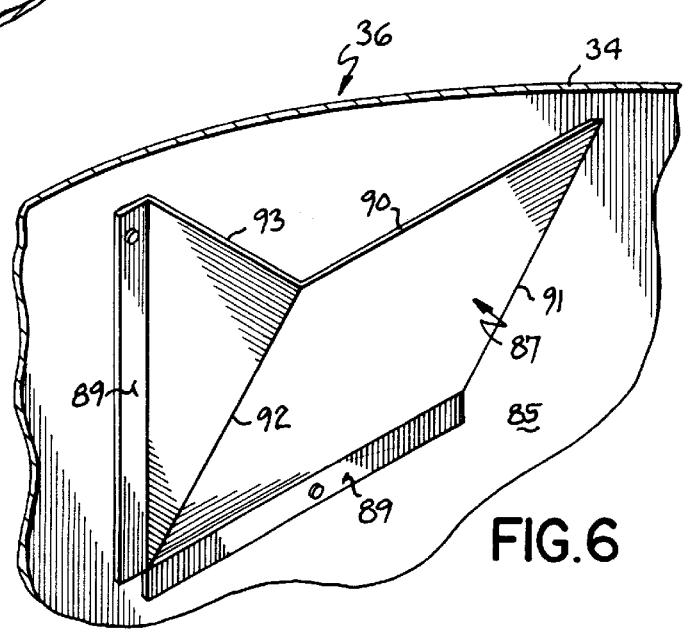
FIG. 6 is a perspective view of one of a ring of side wall deflectors used in the gas scrubber of FIG. 1.

To inhibit the laminar flow and provide more turbulent flow, referring to FIGS. 1 and 6, a deflector system 86 is mounted to the inside surface 85 of the exterior wall 34 and functions to reduce the laminar flow of the gas along the inside surface 85 of the tank 36. The deflectors 86 are comprised of a first row of deflectors 87 and a second row of deflectors 88. The first row of deflectors 87 are equally spaced, for example, at 2 foot intervals, around a circumference of a cross-sectional plane normal to the center line 46. Each of the deflectors 87 has mounting flanges 89 which are used to attach the deflector to the inside surface 85 on the tank side wall 34 by fasteners, welding or other known means. A deflecting plate portion 90 has an interior edge 91 immediately adjacent the interior surface 85. The opposite edge 92 of the deflecting plate 90 is supported away from the interior surface 85 by a triangular support plate 93. Thus, gas moving linearly up the inside surface 85 of the exterior wall 34 strikes the deflecting plate 90 and is redirected. The second row of deflectors 88 are identical in construction to the deflectors 87 and are equally spaced on approximately the same centers but, are circumferentially located approximately between the deflectors 87 in the first row. Thus, the net effect of the deflector system 86 is to disturb the laminar flow of the gas along the inside surface 85 and create, instead, a more turbulent flow.

Referring to FIG. 1, a second water spray assembly 79 is located at the top of the tank 36 immediately below the tank outlet 95. The spray assembly 94 includes a plurality, for example, 24, nozzles 96 which are evenly distributed across a planar cross-section of the tank 36 normal to the centerline 46. The water spray 97 from the nozzles 96 moves in a downward direction through the interior of the tank 36 to the water reservoir 56. The gas passing the deflectors 87, 88 swirls in a turbulent upward flow at a much slower velocity than the exit velocity from the inlet pipe 32. The upward flow of the gas in combination with the downward flow of the water continues to react the TDI in the gas with the water to form urea. Further, the slower velocity of the gas through the counterflowing water spray in the tank from the nozzles 96 continues to wash the urea particles from the gas and down into the reservoir of water 56. The water spray 97 from the nozzles 96 is provided by a pump 98 and pipes 99, 100 such that the water spray 97 from the nozzles 96 continuously recirculates through the tank 36. After leaving the scrubber tank 36, the gas passes through a scrubber exit pipe 102, through blower 48, through a cyclone inlet pipe 104 and into the cyclone tank 106. The cyclone system 30 is effective in a known manner to remove the remaining urea particles, antioxidants and other low molecular weight residuals that remain in the gas. The cleaned gas then is ported to atmosphere through a cyclone outlet 108.

In use, upon a foam bun 22 being loaded on the vacuum table 24, the fan 26 and blower 48 are turned on, thereby pulling ambient air through the foam bun 22 to reduce its temperature and to collect the TDI therein. The gas from the vacuum table 24 is piped into scrubber tank 36 by means of an inlet pipe 32. The gas moves through the inlet pipe 32 at a high velocity and turbulently flows through a counter flowing water spray 50 provided by the spray assembly 51 within the inlet pipe 32. That process causes an immediate and significant reaction of TDI with water, thus forming urea, prior to the gas entering the interior of the scrubber tank 36. Upon entering tank 36, the gas is directed a high velocity downward against the conical deflector 80 and over the surface 82 of the water 56. That action further reacts TDI with water and also facilitates the removal or washing of the urea particles from the gas. The high velocity gas flow over the water surface 82 in combination with the removal of the urea from the gas causes the formation of a froth or foam in which the urea is captured. That froth may be periodically removed from the water surface 82. The gas is then redirected upward within the tank 36 at a lesser velocity against the deflectors 87, 88. The deflectors 87, 88 cause the gas flow to become more turbulent throughout the interior of the tank 36. After leaving the outlet 44 of the inlet pipe 32, the gas is continuously exposed to a water spray 97 from nozzles 96 that is falling within the tank. As the gas moves up through the interior of the tank 36 against the water spray 97, the TDI in the gas continues to react and the resultant urea is washed out of the gas.

The scrubber apparatus of the present invention is effective to react over 99% of the TDI in the gas with water into urea. Further, the constant washing action of the water sprays 50, 97 separates the urea from the gas and, in addition, separates other antioxidants and other low molecular weight residual particles arising from the polyurethane foam forming process. Normally, approximately 50% of those pollutants are removed from the gas by the scrubber system 28 and accumulate within the water reservoir 56.

The presence of the antioxidants within the gas which collect in the reservoir 56, result in an increase of the pH of the water 56. As a number of foam buns 22 are processed as described above, the pH of the water 56 is monitored until it reaches a predetermined limit. That limit is normally defined by the amount of pH that may be corrected by normal filtration processes. At that point, the fan 26 and blower 48 are turned off and the water 56 is drained from the tank 36 through a drainage outlet 110. The urea, antioxidants and other residual particles are in both a foam or froth on the surface 82 of the water 56 as well as suspended in the water 56 as an emulsion. In either event, those materials are removed from the water 56 by filters 112 in a known manner. In the filtering process, the pH may also be corrected so that the water on the outlet 114 may be discharged into local water systems.

The cyclone system 30 operates in a known manner to separate the other 50% of urea, antioxidant and low molecular weight residual particles from the gas; and in a similar manner, those materials are collected from the bottom of the cyclone in line 116, filtered by filters 118 and discharged at 120 into a local water system.

Thus, the present invention provides several simple, inexpensive but important improvements in the construction of a gas scrubber system. For example, the utilization of an introductory water spray 50 within the inlet pipe 32 substantially improves the ability of the scrubber system 28 to react off the TDI. Further, the turbulent flow introduced by deflector system 86 provides substantial improvement in the reaction of the TDI with the water spray 97 inside the tank 36. The net result is that the scrubber system 28 is substantially improved in its ability to knock down TDI within the scrubber tank 36. For example, over 99% of the TDI is reduced to urea within the scrubber system 28; and further, approximately 50% of the urea antioxidant and other residual particles are removed by the scrubber system 28.

While the invention has been illustrated by the description of one embodiment and while the embodiment has been described in considerable detail, there is no intention to restrict nor in any way limit the scope of the appended claims to such detail. Additional advantages and modifications will readily appear to those who are skilled in the art. For example, while only one foam bun 22, vacuum table 24 and fan 26 is illustrated, as will be appreciated, additional vacuum tables and fans may be connected in parallel to the inlet pipe 32. Further, two rows of deflectors 87, 88 are described in the deflector system 86, however, only a single row of deflectors may be used. As described, the water spray assemblies 51, 94 normally direct water through the gas in a direction opposite the flow of the gas. As will be appreciated, the water spray assemblies may be constructed to also direct water at an angle to the direction of gas flow or even in the same direction as the gas flow. While it is preferable to use the conical deflector 80, the scrubber system 28 is also operable without it. In some applications, it may be desirable to periodically skim the froth off the surface 82 of the water 56.

Therefore, the invention in its broadest aspects is not limited to the specific details shown and described. Consequently, departures may be made from the details described herein without departing from the spirit and scope of the claims which follow.

What is claimed is:

1. A method of removing TDI from a gas comprising the steps of:
   passing the gas downward through an upward flowing first spray of water in a tank at a first velocity to react the TDI in the gas with the water;
   directing the gas against water in a lower portion of the tank;
   directing the gas upward along an interior wall of the tank;
   disrupting an upward laminar flow of the gas proximate the interior wall of the tank; and
   directing the gas upward through the tank at a slower velocity through a downward flowing second spray of water to further react the TDI in the gas with water, whereby urea formed from the reaction of the TDI with the water is washed from the gas by the first and second sprays of water and collected by the water in the lower portion of the tank.

2. The method of claim 1 further comprising the step of directing the gas through the first spray of water within an inlet pipe carrying the gas into the tank.

3. The method of claim 2 further comprising the step of directing the gas through a generally L-shaped inlet pipe having the first spray of water within a generally vertical section of the inlet pipe.

4. The method of claim 3 further comprising the step of passing the gas through the first spray of water located closer to a wall section of the vertical section of the inlet pipe being opposite a wall section intersecting a generally horizontal section of the L-shaped pipe.

5. The method of claim 2 further comprising the step of directirig the gas against a conical diffuser located in the tank immediately above a surface of the water in the lower portion of the tank.

6. The method of claim 5 further comprising the step of directing the gas past a plurality of deflecting elements located around a periphery of the conical diffuser.

7. The method of claim 6 further comprising the step of directing the gas upward in the tank and past a first row of deflectors mounted at a first height circumferentially around the interior wall of the tank.

8. The method of claim 7 further comprising the step of directing the gas upward in the tank past a second row of deflectors mounted at a second height circumferentially around the interior wall of the tank.

* * * * *